March 17, 1942.   P. C. JONES   2,276,782
PRODUCTION OF BUTT-WELDED RAIL JOINTS, AND
RAIL ADAPTED FOR USE THEREWITH
Filed Sept. 14, 1938
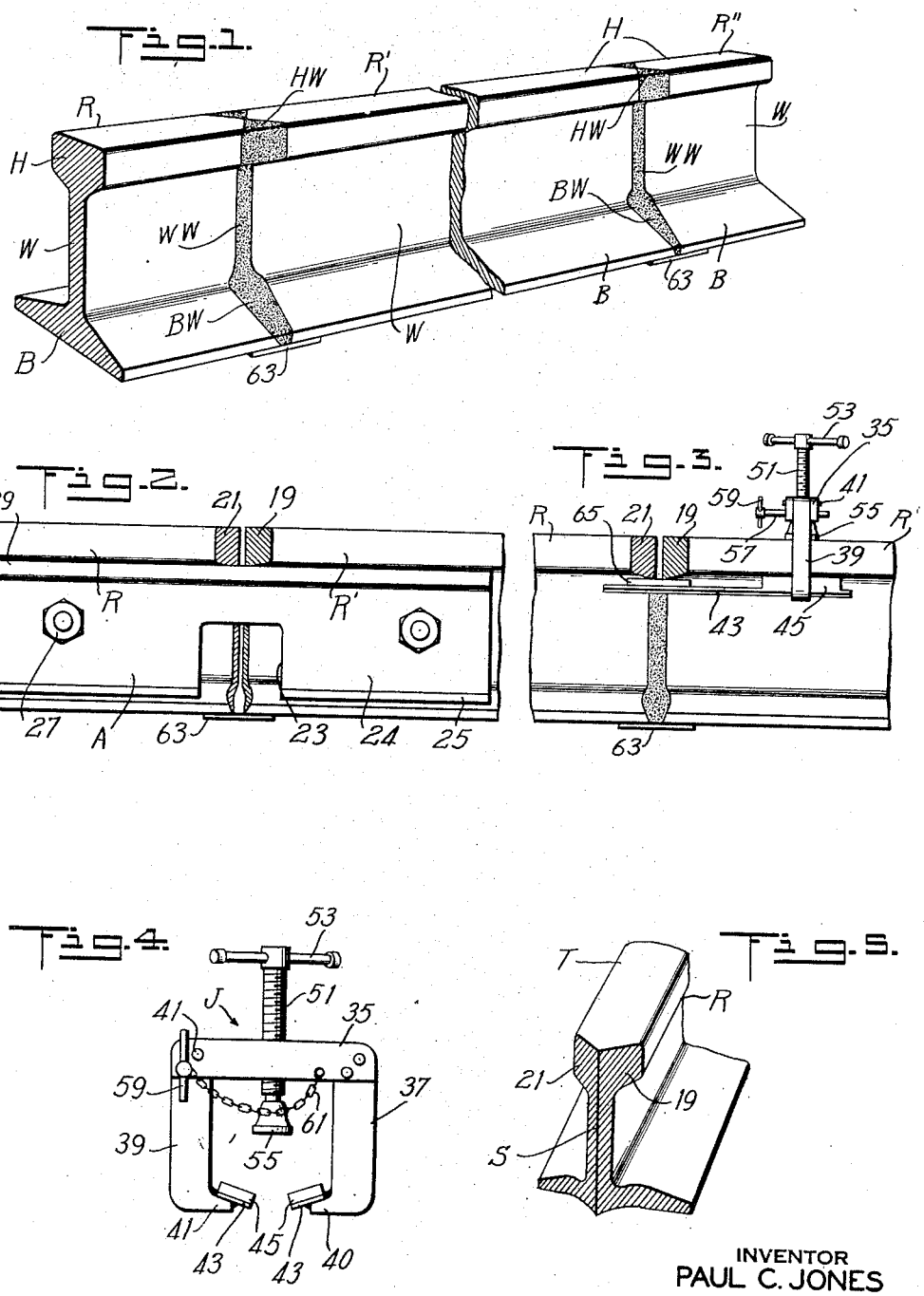
INVENTOR
PAUL C. JONES
BY
ATTORNEY

UNITED STATES PATENT OFFICE 2,276,782

PRODUCTION OF BUTT-WELDED RAIL JOINTS, AND RAIL ADAPTED FOR USE THEREWITH

Paul C. Jones, Niagara Falls, N. Y., assignor to The Oxweld Railroad Service Company, a corporation of Delaware Application September 14, 1938, Serial No. 229,843

18 Claims. (Cl. 113—112)

This invention relates to a novel butt-welded rail joint and to a method and apparatus for producing it, facilitating the continuous inspection and ready control of the welding operation during progress of the work, and insuring a perfect union of steel rails and the production of butt-welded joints of great strength and durability.

Heretofore, in preparing rail ends for butt-welding, the former generally have been prepared for horizontal single transverse V-welds in the head and base of the rail, and either single V or double V-welds in the web of the rail. The re-entrant angles produced by the intersection of the sides of these V's have led to great difficulties in securing welds that were completely penetrated and free from laps and cold shuts. This difficulty especially was noticeable in the base of the rail beneath its intersection with the web, and in the head of the rail near its intersection with the web.

In the production of continuous rails in accordance with prior known methods, recourse has been had to the use of a relatively large-capacity welding blowpipe sufficient to maintain the heavier parts of the rails at the proper welding temperature. The use of such a large-sized blowpipe on an article of non-uniform section, such as a rail, usually is accompanied by cold shuts or laps in the weld, due to the difficulties of preventing overheating of the molten metal directly under the flame. Moreover, the volume of a single transverse V in the head of the rail essentially is so large in proportion to the size of the molten puddle which can be developed, maintained and controlled that at any given time most of the weld metal and scarf are not protected from the oxidizing effects of the atmosphere but are subject to repeated melting and oxidation until the weld is completed. This repeated welding and oxidation is detrimental to the weld metal, and tends to remove or segregate the special alloying elements present in the welding rod. It necessitates special care for the avoidance of inclusions of oxides in the weld or along the scarf.

The more important objects of the present invention are: to provide a novel process and apparatus for producing a continuous stretch of track embodying a plurality of rails united by butt-welded joints; to provide a novel rail having each end tapered continuously from the top of the rail head to the bottom of the rail base; to provide a novel butt-welded rail joint wherein thermal stresses have been minimized and sidewise warping of the rail prevented; to provide in novel manner for butt-welding abutting rail ends while minimizing remelting and deleterious oxidation of the weld metal and metal of the rail; to provide for the use, in the butt-welding of a rail joint, of a medium carbon alloy steel weld metal; and to provide for the concurrent application of weld metal to grooves respectively formed on opposite sides of rail ends at a joint. These and other objects will become obvious from the following specification and the accompanying drawing, which latter illustrates one embodiment of the invention.

Fig. 1 is a perspective view of a section of continuous rail embodying rails united by two butt-welded rail joints;

Fig. 2 is a side view of a rail joint, prior to welding the joint, showing means for aligning the rail ends;

Fig. 3 is a side view of a partially welded rail joint, showing a jig and a metal backing plate in position at a rail joint;

Fig. 4 is a side view of a novel jig forming part of the invention; and

Fig. 5 is a perspective view of a rail end, tapered in accordance with the invention.

Referring to the drawing, each of the letters R, R', R'' respectively designates a rail having a head H, a web W, and a base B. Each rail has at each end thereof forwardly and inwardly tapered or beveled end portions 19, 21, each limited by surfaces which intersect in a substantially vertical plane passing centrally through the rail head, web and base. The angles of bevel of the tapered portion of the head and of the tapered portion of the web of the rail are preferably the same, so that the planes of the beveled portions 19, 21 intersect along a line S which is perpendicular to the rail tread T. Preferably each tapered end of the head and web of the rail includes a horizontal angle of approximately 130°. The angle of bevel in that portion of the rail base adjacent the foot of the web generally is the same as that of the web, and desirably is such that two aligned rail ends form an included V on an angle of about 50°.

For aligning the rail ends ready for and during welding, means are provided, such as the pair of angle bars A, each having a wide slot or recess 23 in the lower midportion. As shown in Fig. 2, each angle bar has a web portion 24 and a horizontal flange 25. The angle bars may be secured to two aligned rails by trackbolts 27, with their upper flanged fishing surfaces 29 resting against the undersides of the rail heads H. The slot 23 in each angle bar permits free access of the welding flames and welding rods to the adjacent margins of the rails at the joints, permitting the bases of the respective rails to be welded together while maintaining the rails in alignment. The bars A are removed from the joint as soon as the two rails have been joined at their respective bases by welding.

For supporting and backing up molten weld metal in the grooves between adjacent rail bases during welding of the latter there is employed, when desired, a metal plate 63 which is placed under the rail bases at the joint and bridges the joint. It may be welded to the rail bases and then remains as part of the finished joint, serving to reinforce the latter.

When making a double V vertical weld to unite the heads of two rails, a backing member 65 of steel or other metal is supported immediately under and spaced slightly below the heads at the joint. This member acts as a dam for molten weld metal and as a starting point for the rail head welding. When permitted to remain after welding of the rail ends, it also serves as a reinforcing member. For supporting one of these strips 65 of metal at each side of the aligned rails at the joint there is provided a jig J in the form of a quick-acting clamping member adapted to be detachably secured upon one of the rails adjacent the joint and at a slight distance from the joint. The jig J, as illustrated in Figs. 3 and 4, comprises a metal bar 35 adapted to extend transversely across and rest upon a rail head. Secured to one end of the bar 35 is a fixed jaw 37. A second jaw 39 is pivotally secured to the opposite end of the bar 35 by means of a pin 41 which extends respectively through the jaw 39 and bifurcated end portions of the bar 35. The jaws 37, 39 have inturned portions 40, 41, respectively; and secured to their free ends are elongated metal members 43, each of which has adjacent the jaws 37, 39 a short portion 45 of thickness greater than the backing members 65, but which portion does not extend as far as the rail joint.

For clamping the jig onto the head of one of the rails, a clamping screw 51 extends through a threaded hole in the bar 35. The screw 51 has a handle 53; and a rail head contacting member 55 is swiveled at its lower end. The jig is adapted to be secured in position upon a rail adjacent a joint, with the lower surface of the swiveled member 55 resting upon the top of the rail head, and with the thickened metal portion 45 carried by the clamping jaws 37, 39 contacting with the under surface of the rail head at the respective sides of the rail. Metal backing members 65 are freely supported upon each member 43 at the rail joint in spaced relation to the under surfaces of each rail head. A removable locking pin 57 having a handle 59 extends through the members 35 and 39 and locks the jig in position upon a rail prior to tightening the clamping screw 51. The pin 57 is secured to the member 35 by means of a flexible member such as the chain 61 to prevent its loss.

An important feature of this process resides in the novel preparation of the rail ends to be butt-welded. Such preparation may be effected during fabrication of the rail; or, in instances where rails of standard design are used, it may be accomplished at the point of use of the rails, or of fabrication of the rail joints. After moderate preheating of the rail ends to be joined, portions thereof adjacent the joints are removed in suitable manner—preferably by an oxyacetylene cutting torch or the equivalent—to provide a double beveled end surface on the rail head and the web, and the end of each side of the base is also beveled. The beveled end of each rail lies in a plane that includes portions of the rail head, web and base.

When two rails thus beveled are placed with their ends in closely-spaced relation, V's or welding grooves or passages are formed on opposite sides of the opposed rail ends, to receive weld metal during the welding operation. Each of these grooves extends continuously from an outer margin of the base of the rail, across the base, up along the web, and to the top of the head of the rail. The portions of the welding grooves formed by the beveled rail webs and heads are vertical and disposed back-to-back to provide a double V welding groove.

Preferably a metal backing plate 63 is then placed under the adjacent beveled rail bases and bridges the joint to facilitate complete fusion and bonding of the metal of the rail bases with filler metal during the welding operation. When utilizing the plate 63, sufficient metal is removed from the rail bases during their preparation so that when two rails are aligned preparatory to butt-welding them, a wide welding groove is formed at each side of the rail between adjacent rail bases. These grooves may be approximately 0.5 inch or more in width. Unfused notches at the bottom of the welded metal thus are avoided by initiating the weld at the plate 63, the welding thereafter progressing to the metal of the rail bases. Due to the wide variety and great magnitude of the stresses encountered under service conditions, it is extremely important that no unfused notches or other zones of weakness exist in the welded rail joint.

When the rails are in end-to-end position ready for the welding operation, the ends may be spaced apart a distance of from around one-eighth inch to three-eighths of an inch. Even greater spacings of the rails may be employed, though at some sacrifice of welding efficiency. On the other hand, if the rails touch each other for any substantial distance it is important that the contacting portions first be removed in order to insure production in the welding operation of a continuous welded body of the desired characteristics.

In order to secure the most satisfactory results, the welding operation for forming the rail joint preferably is performed by two welders, simultaneously using two sources of welding heat, such as oxyacetylene torches or the equivalent, on opposite sides of the rails at the joint and progressively depositing weld metal at about the same parts of the two opposite welding grooves.

Less desirably, the welding operation may be performed by means of a single source of welding heat, in which case it is desirable to complete the welding in limited similar zones at the respective sides of the rails at the joint before continuing the welding to succeeding zones. Thus, the welding of the base portions at each side of the joint should be completed before proceeding to weld the webs. It is possible to complete the welding of the joint at one side of the rails before beginning the welding at the other side thereof, though at the sacrifice of many important advantages secured in welding operations conducted concurrently on opposite sides of the rails.

In the preferred practice of the invention, the surfaces of the rail ends to be united and the surfaces of the weld metal are treated to form thereon thin carburized surface layers which melt at a lower temperature than the underlying metal forming the main bodies of the rails. High temperature heat is applied to these rail ends to melt the carburized portions while maintaining adjacent portions of the rail metal above the melting point. The molten carburized portions then are united by flowing thereon molten filler metal in the presence of a reducing or non-oxidizing gas. Preferably the carburizing of the rail surfaces at the joint and of the welding rod metal is effected concurrently with the welding operation by the use of an excess acetylene flame or the equivalent, as more fully described in United States Patent No. 1,973,341, issued September 11, 1934, to Harry S. George.

This employment of carburizing flames for the welding operation has special utility in the butt-welding of rails. Because of their irregular cross-sections, it often is difficult to heat to a proper welding temperature each part of rail ends to be joined—when using the electric arc or the well-known "neutral" type of flame widely employed for gas welding with oxyacetylene and similar combustible mixtures—without overheating and injuring adjacent parts of the rail, due to the excessively high local temperatures attained in narrow zones of the rail metal. The use of a welding gas mixture which carburizes a surface layer of the rail metal and concurrently melts such layer permits the welding to be conducted at lower temperatures than otherwise is possible; and it provides a protective blanket of reducing gases surrounding the rail ends being joined, the welding rod and adjacent rail parts, and actually removes from the hot metal any oxides originally present thereon. A minimum of the rail metal at the joint is melted; and the molten metal deposited in making the joint unites more thoroughly and quickly with the superficially melted rail metal.

However, it is within the scope of this invention to employ other welding means, such as an electric arc or a "neutral" or non-reducing oxyacetylene flame or its equivalent, although at some sacrifice of economy, convenience, and the quality and dependability of the welded joint. When using an electric arc or "neutral" flame, it is advantageous to blanket the welding zone with a reducing or carburizing gas or gas mixture.

According to a preferred form of the invention, wherein a metal backing plate 63 is employed, such plate—as for example, a steel plate $\tfrac{3}{16}$ inch by 2 inches by 5½ inches—is placed under the rail bases across the joint. It prevents loss of molten metal from the joint and gives the latter increased strength. The welding is begun by fusing the portion of the plate 63 directly beneath the webs and the rail metal in the bottoms of the V's in the rail bases. After depositing weld metal to complete the welding in the central portions of the bases concurrently on both sides of the rails up to the junction with the webs, the welding is continued in the bases outwardly from the center toward both side margins until the welding grooves are filled with weld metal. The angle bars then are removed, and both welders move their torch flames to the junction of the bases and the webs, and the welding is concurrently continued upwardly beyond the junction of the webs and the undersides of the rail heads; and at the center of the two V-s they preferably are carried one-fourth of the way into the heads.

At this point in the welding process, the metal plates 65 are placed below and spaced a short distance from the undersides of the rail heads at each side thereof and extending across the joint, each being held in position by the jig shown in Figs. 3 and 4. It is important that the welds in the webs at the joint be carried above the top level of the plates 65 when in position so that, after positioning the latter, it is unnecessary to "bore in" with the welding flames to get complete penetration at the junction of the head and the web.

Generally the plates 65 are spaced below the rail heads about one-eighth inch, thus facilitating the heating of the plates to a fusion temperature and the initiation of the welding there before the heat applied causes fusion of the metal of the rail heads, which already is at high temperature due to heat absorbed during welding of the rail bases and webs. The plate spacing also increases the effective depth of the rail head welds. The metal of plates 65 may be retained in the finished weld; or it may be removed if the subsequent use of certain angle bars requires it.

When beginning the welding of the heads, the plates 65 are welded simultaneously to the rails along the lower margins of the vertical double V's in the rail heads, thus providing a thoroughly complete bond between the plates and the rail heads and forming dams preventing loss of molten metal subsequently added to fill the V grooves and complete the rail treads at the joint. The volume of weld metal required for building up the head is very much less when using this double V preparation of the head at the joint than is required for filling in a transverse single V weld in the rail heads according to prior practice.

Because of the partial barrier constantly maintained between the two sides of the rails by the double beveled rail ends, it has been found possible to use two welding flames that are always closely adjacent each other and yet do not interfere with the operation of each other but actually cooperate to maintain suitable welding temperatures at the joint. This greatly increases the rate of welding of the rail joint, regardless of the irregular variations in the cross-section of the metal parts being welded. Obviously, such use of two adjacent flames in a single V weld would be impractical.

It is customary in making the weld to remove the holding jig J as soon as the plates 65 are properly welded to the undersides of the rail heads by the respective welding flames. After the head welds are completed, the welding flames may be used for melting away the metal of the plates 65; or the plates may be left on the rail to serve as reinforcements.

A medium carbon alloy steel welding rod preferably is employed for making these butt-welded rail joints. Extensive tests have demonstrated that such a welding rod provides a joint that is better both in respect to strength and ductility than that secured by the use of low carbon steel rods heretofore in general use for such operations—particularly when utilizing carburizing or reducing oxyacetylene flames or the like as sources of welding heat. Moreover the tread surface of the rail head at the top of the welded portion is of the same order of hardness as the adjacent unwelded portions of the rail head, so that wear and cold flow of the metal are substantially the same in the joints and in the remainder of the rail when using a medium carbon alloy steel welding rod for the welding operations. A medium carbon alloy steel welding rod found particularly suitable for use with the invention is around 0.19 inch to 0.25 inch in diameter, and contains from 0.4% to 0.5% of carbon, from 0.9% to 1.10% of manganese, from 0.6% to 0.7% of silicon, and from 1% to 1.2% of chromium—the balance being iron. Other medium carbon steel weld metal as well as low carbon alloy steel weld metal may be satisfactorily employed in the process.

It has been found advisable, though not essential, following completion of the weld, to allow the latter to cool below the critical temperature, and then to use the welding flame or other suitable heating means to reheat the weld and adjacent metal to a temperature of the order of 1500° to 1600° F. This treatment improves the ductility of the steel because of the resultant recrystallization and refinement of the grain structure. After the weld has been thoroughly heated to the desired temperature, the joint is covered with asbestos or other heat-insulating material and allowed to cool at a uniform moderately slow rate, thereby normalizing the metal at and adjacent the joint.

Following the normalizing of the metal adjacent the butt-welded rail joint, the latter generally is subjected to a grinding, hammering, or equivalent operation in order to level the top portions of the welds between the heads flush with the treads of the rails; to give the welded joint a finished appearance; and to prepare it for the connection thereto of angle bars, track plates, and the like. Fig. 1 illustrates the finished butt-welded rail joint of the invention. The parts marked HW represent weld metal in place in the rail heads; WW designates weld metal in the rail webs at the joint; and BW designates weld metal bonding the rails at their bases. The parts HW, WW and BW at each side of the joint thus provide two continuous fusion-deposited welds extending from the lateral edges of the bases to the rail treads.

The heat provided by each of the welding flames is supplemented by heat from the other, so that the welding is accomplished by two flames, each much smaller in size than would be required where only one flame is used. These small flames are much less likely to cause overheating and burning of the high carbon steel than are single large flames, particularly when carburizing or reducing oxyacetylene flames or their equivalent are used. The smaller pool of molten metal produced with these smaller flames is easier to control, and is not subject to the excessive oxidation encountered when using single large flames. Since, in the present process, portions of the rails at the joint on opposite sides of the longitudinal plane through the rail heads and webs are heated concurrently and to substantially the same degree, thermal stresses are minimized, and both sidewise warping of the rails and the retention of severe stresses in the joints are prevented.

The type of V preparation hereindescribed has especial importance in welding metal structural members of irregular cross-section, because no overhead welding is necessary; and the welders always have a full view of the welding zone, without being obliged to take an uncomfortable position that would interfere with their manipulations of the welding flames and welding rods. The parts being joined are always easily accessible to both the flames and the welding rods.

Certain parts of the invention may be used without others, and various changes may be made in the construction and procedure disclosed herein without departing from the principles of the invention.

I claim:

1. A steel rail adapted for use in the production of a substantially continuous butt-welded track, the said rail having a head, a web and a base, said head having a tread surface, each end of said head and said web having beveled portions disposed between planes intersecting along a line substantially perpendicular to said tread surface, each end of said base having beveled portions which merge with the beveled portions of said web whereby, when such rail is positioned in longitudinal alignment with a similarly shaped end of another rail as set forth, continuous grooves extending from the lateral edges of said base to said tread will be provided to receive weld metal for uniting the respective heads, webs and bases of such rails.

2. A welded rail joint comprising, in combination, two steel rails disposed end-to-end in alignment, each rail having a head, a web and a base, each head having a tread surface, and two similar generally wedge-shaped, continuous fusion-deposited welds formed respectively at opposite sides of the rail heads, webs and bases, and permanently uniting the adjoining ends of such rails, each of said welds terminating between such rail heads and flush with the tread surfaces of the latter, thereby providing across the joint substantially continuous tread surfaces of parent rail steel between tread surfaces of weld metal flush with the tread surfaces of parent rail steel.

3. A welded rail joint comprising, in combination, two steel rails disposed end-to-end in alignment, each rail having a head, a web and a base, such heads having aligned tread surfaces, the respective head and web of each rail having lateral surfaces thereof at the ends tapered forwardly and inwardly so as to intersect along a line extending within the respective rail heads and webs, and two similar deposits of weld metal uniting the tapered lateral surfaces of the adjoining ends of said rails and disposed in the same transverse plane substantially perpendicular to said tread surfaces, each deposit extending continuously from an outer lateral edge of the aligned bases, across such bases, thence across the aligned webs and heads, and terminating flush with the tread surfaces of said heads, thereby providing across the joint substantially continuous tread surfaces of parent rail steel interposed between tread surfaces of weld metal flush with the tread surfaces of parent rail steel.

4. An elongated steel rail member adapted for use in the production of a substantially continuous butt-welded track, which comprises a head portion, a base portion and an intermediate web portion, the said rail having at each end thereof a beveled substantially vertical end margin formed in the head, web and base and adapted, when the rail end is in longitudinally-aligned relation with an end of a similar rail, to form laterally at each side of contiguous ends of the rails a continuous groove defined by the heads, webs and bases of the respective rails.

5. A metal rail adapted for use in the production of a substantially continuous butt-welded track, the said rail having head, web and base portions, and having at each end thereof an outwardly and rearwardly beveled forwardly-extending end portion, the foremost margin of which terminates in a general plane passing through the rail head, web and base and forms in the rail head and web an included horizontal angle of approximately 130°, the end margins of the rail base laterally of said plane being beveled forwardly and downwardly.

6. A butt-welded rail joint formed of two metal rails permanently united end-to-end by two continuous wedge-shaped deposits of weld metal, each of said rails having a head, a web and a base, such heads having alined tread surfaces, each of said deposits of weld metal having an upper end margin flush with the tread surface of each rail head, and consisting of a medium carbon alloy steel simultaneously applied to each of said rails on opposite sides of adjacent ends thereof by welding heat produced by two independent sources thereof, the tread surfaces of the welded portions of the rail heads being of the same order of hardness as the adjacent unwelded portions of said rail heads.

7. A butt-welded rail joint comprising two aligned rails having heads, webs and bases permanently united by means of opposed generally wedge-shaped bodies of weld metal extending throughout the ends of the heads, webs and bases of the respective rails, and simultaneously applied to said rails on opposite sides of the adjacent ends thereof by welding heat providing carburizing conditions at the welding zones, said rail heads having aligned tread surfaces, each of said bodies of weld metal having an end margin flush with the tread surfaces of said rail heads for service as a portion of the tread surface, the respective opposed bodies of weld metal having their wedge-shaped margins within the rail heads and webs united by weld metal.

8. A butt-welded rail joint comprising two aligned rails having their respective web and heads permanently united by opposed vertically disposed continuous wedge-shaped bodies of weld metal simultaneously applied upon opposite sides of the rails, the wedge-shaped surfaces of the respective bodies of weld metal being joined along a line extending throughout the rail webs and heads, and a wide reinforcing member underlying each of the respective rails, the base of each of the rails being permanently united with the said reinforcing member and with each other.

9. Process for preparing butt-welded rail joints, which comprises disposing two rails with their ends in closely-spaced relation, each of said rails having tapered head and web portions at the respective sides thereof adjacent the end margins, thereby defining continuous communicating grooves between the rails on each side thereof, said grooves being in aligned communication with lateral grooves defined by the respective rail bases at each side of the rails, and welding the rails progressively along each of the grooves in the rail bases, webs and heads simultaneously on opposite sides of the rails by welding heat flowing to the respective grooves from independently controlled sources of welding heat.

10. Process for preparing butt-welded rail joints, which comprises disposing two rails with their ends in closely-spaced relation, each of said rails having respective head, web and base portions, the said rail ends being adapted to be in close proximity to each other along a narrow vertically-disposed zone extending throughout the length of said head and web portions, thereby defining continuous communicating grooves between the rails on each side of said head and web portions and between the rail bases, and welding the rails progressively and simultaneously along each of said grooves and building up the rail treads by weld metal consisting of a medium carbon alloy steel.

11. Process for producing a butt-welded rail joint, which comprises aligning two rails with a tapered end of each in closely-spaced relationship with a tapered end of the other rail, simultaneously and progressively welding the rails on opposite sides thereof along zones extending from the base directly beneath the web of each rail to the respective outer margins of the base, thereafter simultaneously and progressively welding adjacent portions of the respective rails at the webs in a direction from the bases upwardly at least to the heads of the rails, positioning metal backing members adjacent the under surfaces of each of the respective sides of the heads at the joint thus formed, and progressively building up the rail heads by deposition of weld metal applied simultaneously to the rail heads at opposite sides of the rails.

12. Process for producing a butt-welded rail joint, which comprises aligning two rails having head, web and base portions with a tapered end of each rail in closely-spaced relationship with a tapered end of the other rail, simultaneously and progressively welding the rails at opposite sides thereof along zones extending from the base directly beneath the web of each rail to the respective outer margins of the bases, thereafter simultaneously and progressively welding portions of the rails at the webs extending from the rail bases into the heads of the rails, supporting metal members adjacent to but spaced below the undersides of the rail heads at the joint thus formed, and building up the rail heads by simultaneous deposition of weld metal progressively applied upon the last-named metal members in opposite directions from the midportions of the heads laterally to the respective outer margins of the heads, the said welding being effected by the use of at least one carburizing welding flame on each side of the rails, thereby concurrently carburizing surface layers of the rail metal and of the weld metal at the respective sides of the rail while heating the said carburized layers to their fusion temperature in a reducing atmosphere.

13. Process for producing a butt-welded rail joint, which comprises aligning two rails having tapered ends with an end of each in closely-spaced relationship with an end of the other rail, positioning a metal member beneath and in contact with the spaced rail ends, simultaneously and progressively welding the rails on opposite sides thereof along zones extending from the base directly beneath the web of each rail to the outer margins of the bases, thereafter simultaneously and progressively welding the web portions of the rails at each side of the latter from the bases upwardly at least to the heads of the rails, positioning metal members closely adjacent the undersides of the heads of the rails at the respective sides of the latter, progressively building up the rail heads to form a unitary structure by deposition of weld metal applied simultaneously upon said last-named metal members and the rail heads at opposite sides of the tapered end portions of said heads, and normalizing the rail joint thus formed.

14. Process for producing a butt-welded rail joint, which comprises placing in closely-spaced relation an end of each of two rails having their ends shaped to define, when in such relation, continuous communicating grooves respectively extending in opposite sides of the rails from the tops of the rail heads to the outer lower margins of the rail bases, the said grooves having beveled side margins throughout their lengths, positioning a metal backing member beneath and in contact with the spaced rail ends, concurrently fusing and uniting the metal of the backing member and that in the bases of contiguous ends of said rails directly beneath the webs and at each side of the rails, continuing the welds thus formed in the bases laterally toward each of the outer margins of the bases, thereafter simultaneously welding the rails at each side thereof progressively from the juncture of the bases and webs upwardly to a point above the juncture of the webs and undersides of the heads of the rails, supporting metal members adjacent to but below the undersides of the heads of the rails thus joined and at opposite sides of the latter, and thereafter welding the rail heads by weld metal simultaneously applied at opposite sides of said heads and progressively from the adjacent inner margins of the rail heads to the outer upper margins thereof.

15. Process for producing a butt-welded rail joint, which comprises placing in closely-spaced relation the ends of two rails, said ends being shaped to define, when in such relation, a continuous groove at each of the respective sides of the rails and extending from the tops of the rail heads to the outer lower margins of the rail bases, the portions of said grooves in the rail heads and webs communicating with each other, positioning a metal backing member beneath and bridging the spaced rail ends, simultaneously welding together the backing member and the rail metal at points in the respective grooves in the rail bases directly beneath the webs and at each side of the rails, continuing each of the resultant welds within the respective grooves in the bases to the respective lateral outer margins of the latter, thereafter simultaneously welding the rails at each side thereof progressively upward from the juncture of the bases and webs to a point substantially above the juncture of the webs and the undersides of the rail heads, positioning metal members adjacent to but in spaced relation to the respective undersides of the rail heads on the respective sides thereof, and thereafter welding together the rail heads by weld metal concurrently applied at opposite sides of the midportions of the rail heads in a direction from said midportions to the outer upper margins of the rail heads.

16. A welded rail joint comprising, in combination, two steel rails disposed end-to-end in alignment, each rail having a head, a web and a base, each head having a tread surface, the end of each head having beveled portions disposed in planes intersecting along a line substantially perpendicular to said tread surfaces, and the adjoining end of each web also having beveled portions disposed in planes intersecting along said line, the beveled portions of each rail cooperating with the corresponding beveled portions of the other rail to form a double V groove, and two similar fusion-deposited welds disposed in said double V groove and uniting the adjoining ends of said rails, each of said welds terminating between such rail heads and flush with said tread surfaces, thereby providing substantially continuous tread surfaces of parent rail steel across the joint, interposed between aligned tread surfaces of weld metal.

17. A rail joint comprising, in combination, two steel rails disposed end-to-end in alignment, each rail having a head, a web and a base, such heads having aligned tread surfaces, the end of each head having beveled portions disposed in planes intersecting along a line perpendicular to said tread surfaces, the adjoining end of each web also having beveled portions disposed in planes intersecting along said line, and the end of each base being substantially transverse of the rail and having beveled portions which merge with the beveled portions of the web, the beveled portions of each rail cooperating with the corresponding beveled portions of the other rail to form continuous grooves extending from an outer lateral edge of the aligned bases along the top thereof, then along the sides of the webs and heads, and to said aligned tread surfaces, and two similar deposits of weld metal uniting the adjoining ends of said rails and disposed in the same plane substantially perpendicular to said tread surfaces, each deposit extending continuously from an outer lateral edge of the aligned bases, across such bases, thence across the aligned webs and heads, and terminating flush with said aligned tread surfaces.

18. A railroad rail joint comprising, in combination, two steel railroad rails disposed end to end in alignment; each of said rails having a head, a base, and a web integral with and connecting said head and said base; each of such heads having a top tread or running surface for railroad rolling stock; the end of each of said heads having two similar beveled portions disposed in planes intersecting along a line substantially perpendicular to such tread surface, the end of each of such webs also having two similar beveled portions disposed in planes intersecting along said line; the beveled portions of one of the rail ends cooperating with the beveled portions of the other of the rail ends to form a vertical double V groove extending from adjacent the bases of said rails to the top tread surfaces of said rails; a deposit of weld metal disposed in each of the two halves of said double V groove and uniting the adjoining head and web portions of said rails, such deposits of weld metal being similar and their top ends terminating flush with said tread surfaces and providing running surfaces upon which railroad rolling stock crosses said joint; and welds uniting the ends of the bases of said rails.

PAUL C. JONES.